United States Patent
Powers et al.

(10) Patent No.: US 7,133,367 B2
(45) Date of Patent: *Nov. 7, 2006

(54) EMBEDDED CELL LOOPBACK METHOD AND SYSTEM FOR TESTING IN ATM NETWORKS

(75) Inventors: Randall L. Powers, Raleigh, NC (US); Robert S. Kroninger, Wake Forest, NC (US); Melvin R. Phillips, Raleigh, NC (US); Dieter H. Nattkemper, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/069,271

(22) Filed: Mar. 1, 2005

(65) Prior Publication Data

US 2005/0147107 A1    Jul. 7, 2005

Related U.S. Application Data

(62) Division of application No. 10/093,296, filed on Mar. 6, 2002, now Pat. No. 6,873,598.

(51) Int. Cl.
*H04J 3/14* (2006.01)
(52) U.S. Cl. .................................. 370/248; 370/249
(58) Field of Classification Search ............... 370/241, 370/241.1, 242, 244, 249, 248
See application file for complete search history.

(56) References Cited

U.S. PATENT DOCUMENTS

| | | | |
|---|---|---|---|
| 5,313,453 A * | 5/1994 | Uchida et al. ............... 370/248 |
| 5,659,540 A | 8/1997 | Chen et al. |
| 5,710,760 A | 1/1998 | Moll |
| 5,812,528 A * | 9/1998 | VanDervort .................. 370/235 |
| 5,901,141 A * | 5/1999 | Gruber et al. ............... 370/248 |
| 6,269,083 B1 | 7/2001 | Nagata et al. |
| 6,563,795 B1 | 5/2003 | Gruber et al. |
| 6,873,598 B1 * | 3/2005 | Powers et al. ............... 370/248 |

* cited by examiner

*Primary Examiner*—Min Jung
(74) *Attorney, Agent, or Firm*—Fogg and Associates LLC; Jon M. Powers

(57) ABSTRACT

The present invention relates to a method and apparatus for testing components in ATM networks utilizing loop-back based ATM layer testing. The method and apparatus utilize interfaces and identifier codes to send and loop-back test cells along portions of virtual channels to test the virtual channels.

6 Claims, 7 Drawing Sheets

FIG. 1

Prior Art

EMBEDDED CELL LOOPBACK METHOD AND SYSTEM FOR TESTING IN ATM NETWORKS

CROSS-REFERENCE TO RELATED APPLICATIONS

This is a divisional application of U.S. patent application Ser. No. 10/093,296 filed Mar. 6, 2002 now U.S. Pat. No. 6,873,598, titled "EMBEDDED CELL LOOPBACK METHOD AND SYSTEM FOR TESTING IN ATM NETWORKS" and commonly assigned, the entire contents of which is incorporated herein by reference.

TECHNICAL FIELD

The present invention relates to a method and apparatus for testing components in ATM networks and, amongst other things, to a method and system for utilizing loop-back based ATM layer testing.

BACKGROUND

Figure 1:
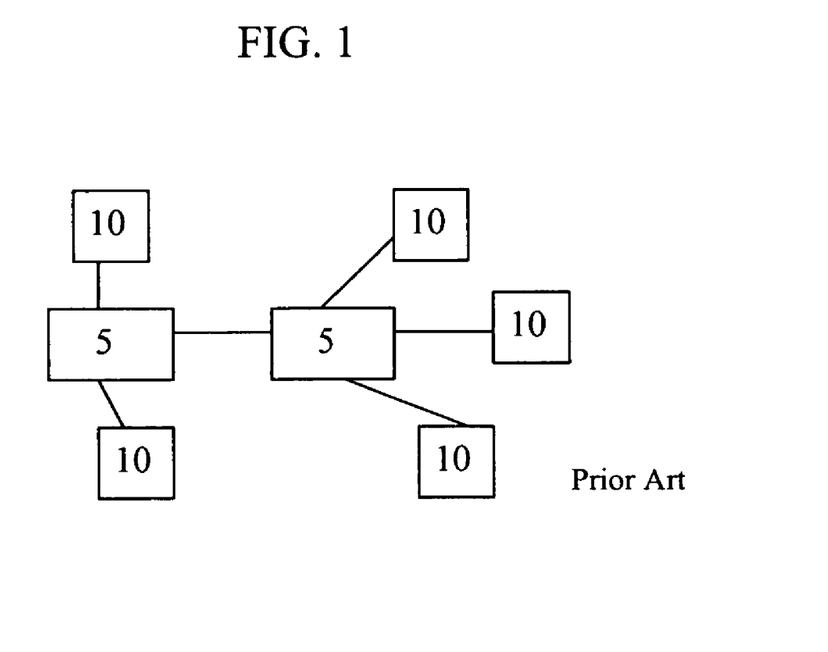
FIG. 1 is a block diagram of an ATM network as is known in the art.

An Asynchronous Transfer Mode ("ATM") network is made up of an ATM switch 5 and ATM endpoints 10. The ATM switch 5 is responsible for cell transit through an ATM network. The job of an ATM switch 5 is to accept the incoming cells from an ATM endpoint 10 or another ATM switch 5. It then reads and updates the cell-header information and quickly switches the cell to an output interface toward its destination. An ATM endpoint 10 contains an ATM network interface adapter. Examples of ATM endpoints are workstations, routers, digital service units (DSUs), Remote Terminals, LAN switches, and video coder-decoders (CODECs). FIG. 1 illustrates an ATM network made up of ATM switches 5 and ATM endpoints 10. Virtual channels are provisioned and dedicated paths that pass through a number of ATM switches 5 and end points 10 that allow for a circuit switched type connection in a packet-based network. A virtual path is a logically associated group of virtual channels that pass through the same components in one or more ATM switches.

The ATM reference model utilizes the following layers: (i) a physical layer that is analogous to the physical layer of the OSI reference model and manages the medium-dependent transmission; (ii) an ATM layer, which is roughly analogous to the data link layer of the OSI reference model and is responsible for establishing channels and passing cells through the ATM network; and (iii) ATM adaptation layers (AAL) that translates higher layer services into the size and format of an ATM cell. In order to establish and pass through cells, the ATM switch 5 translates and routes each cell that it receives. To do this, the ATM switch 5 uses information in the header of each ATM cell. The information includes, for example: (i) a Virtual Channel Identifier (VCI), which identifies the virtual channel of the cell, and (ii) a Virtual Path Identifier (VPI) that identifies the virtual path of the cell. The ATM switch typically performs this function by utilizing a look-up table.

Communication to end-users from the high bandwidth backbone network, commonly called the "last mile", is provided by coaxial cable networks, Digital Subscriber Lines (DSL), which are most commonly Asymmetric Digital Subscriber Lines, twisted pair modem connections, or wireless connections. DSL technology encompasses a variety of technologies including but not limited to asymmetric digital subscriber line (ADSL), symmetric digital subscriber line (SDSL) including G.SHDSL, high bit rate digital subscriber line (HDSL), very high bit rate digital subscriber line VHDSL, and rate adaptive digital subscriber line (RDSL). In the case of DSL, a central office terminal is typically connected to a high bandwidth network, e.g. a DS1, DS2, DS3, or DS4 network. The central office terminal is coupled to a remote terminal that provides the DSL connection to the end user. The remote terminals often utilize minimal processing capabilities in order to reduce their cost.

In ATM networks most of the monitoring occurs at the physical layer, meaning that the individual units, e.g. ATM switches, LAN switches, remote terminals, and end units, in the network provide alarms or other error message when problems with physical transmission are determined. However, physical layer monitoring does not monitor the virtual channels at the ATM layer, specifically the queuing, routing and translation functions that provide the virtual channel functionality through different elements in the network. Since ATM and DSL connections have extremely high throughputs the inability to test the channel as a whole or in part can result in missing translation or routing problems that can result in cells being transmitted along incorrect virtual channels.

In addition, ATM utilizes Operations and Maintenance (OAM) layer functions to perform testing at the AAL. OAM cells are injected to test either virtual paths or provisioned virtual channels and can be sent from the testing apparatus to an end point or can be looped back between any two ATM nodes along the virtual path or virtual channel. However, OAM cells are limited to ATM links in the network and generally require processing capability in each of ATM switches or end units that the OAM cell passes because the cell identity is contained in the cell payload and these cells cannot be readily distinguished from data cells. This increases the cost of the equipment needed for the end points that in turn drives up the overall cost of the ATM system.

Therefore, it is desired to have an effective and low cost method for testing virtual paths and virtual channels of ATM networks.

SUMMARY

In one embodiment the present invention is directed toward a method for determining a status of virtual channels in a distributed cell based network. The method comprises transmitting a test cell from a central office terminal to a first selected interface along a first portion of a virtual channel. The method also comprises identifying the test cell at the first selected interface, transmitting a looped back test cell from the first predetermined interface along a second portion of the virtual channel, determining if the looped back test cell is received at the central office terminal, and determining the status of the virtual channel based upon the looped back test cell.

DETAILED DESCRIPTION

Figure 2:
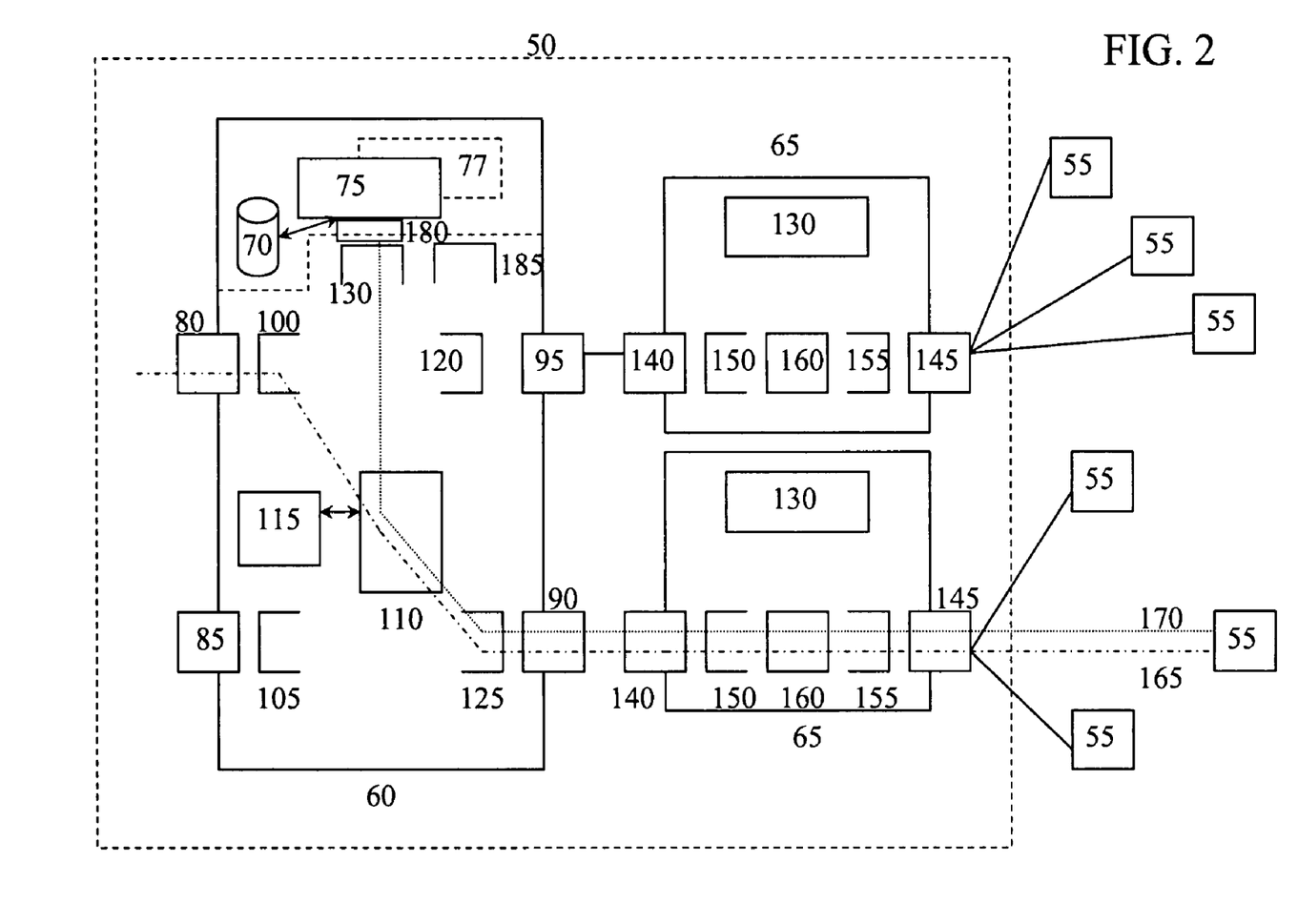
FIG. 2 is a block diagram of an ATM network according to one embodiment of the present invention.

Referring to FIG. 2, access network 50 controls the provision of DSL communication to the end points 55 from the network. The access network 50 includes a central office terminal 60 and a number of remote terminals 65 that provide connection to the physical lines over which the DSL services are provided to the end points 55. The central office terminal database 70 maintains information on each of the virtual channels and virtual paths that are routed through the central office terminal 60, e.g. whether the virtual channel is "up", available or "down", unavailable, and any alarms that are active at any of the physical components through which the virtual channel passes. The central office terminal processor 75 performs monitoring and control of the channel between the central office terminal 60 and the network and controls voice connections that are input into the central office terminal 60. In addition, central office terminal processor 75 injects test cells into the virtual channels in order to test their status. A second central office terminal processor 77 is also provided as a redundant backup for the central office terminal processor 75. However, the second central office terminal processor 77 is only provided for redundancy purposes and is not required for operation according to the present invention.

The central office terminal 60 also includes network interfaces 80 and 85 that provide the physical connectivity to different networks that are provided to the end units. These networks can be voice, ATM, IP or the like. The actual number of network interfaces utilized is dependent on the number of networks that are connected to the central office terminal 60. A number of remote terminal interfaces 90 and 95 provide the connection on the end user side of the central office terminal 60 and to the remote terminals 65. Each of the network interfaces 80 and 85 and remote terminal interfaces 90 and 95 have an associated queue 100, 105, 120 and 125. The queues 100, 105, 120 and 125 store cells that are to be transmitted from and that are to be received at the interface. Further, it is possible that each queue 100, 105, 120 and 125 is divided into separate output queues for each port that utilizes the interface, in the case where there is more than one port per interface. In addition, central office processor queue 130 queues the cells that are transmitted to and from the central office processor 75.

An ATM switch 110 controls the routing and translation for all cells that are received by the central office terminal 60. ATM switch 110 preferably has separate ports for each of the interfaces 80, 85, 90, 95 and 180 of the central office terminal 60 in order to allow for proper translation and routing of cells. Translation is performed by utilizing a translation table 115 that is part of the ATM switch 110. If there are separate ports for each interfaces 80, 85, 90, 95 and 180 of the central office terminal 60, then a separate translation table 115 would be required for each of the ports. As used in this description, the term routing will mean both the routing and translation functions of the ATM switch 110.

The remote terminals 65 provide the DSL services to the end points 55. In one embodiment, the remote terminals 65 pass through cells with minimal queuing and translating to reduce the processor power of the remote terminal 65. A remote terminal processor 130 controls operation of the remote terminal 65. The remote terminal central office interface 140 couples the remote terminal to the central office terminal, while the remote terminal end point interface 145 couples the remote terminal 65 to the end points 55. Each of the remote terminal central office interfaces 140 and remote terminal end point interfaces 145 has an associated queue 150 and 155 respectively that queues the cells that are received at and transmitted from the interface. The ATM multiplexer 160 performs the routing and translation functionality for ATM cells received and transmitted by the remote terminal 65.

In order to test the ATM layer of a virtual channel, for example virtual channel 165, the central office terminal processor 75 generates a test cell that is stored in the central office terminal processor queue 130 for transmission along a test path 170 that comprises a portion of the virtual channel 165 to be tested. The test cell is input through central office processor interface 180 to the ATM switch 110 that routes it along the virtual channel 165, to the queue 125 associated with the virtual channel 165. The test cell is then read by the remote terminal interface 90, which determines whether to let the test cell pass through or to loop it back. The remote terminal interface 90 makes this determination based upon an identifier code contained in the test cell. If the identifier code allows the cell to be passed through, it is transmitted to the remote terminal 65 coupled to the remote terminal interface 90. The test cell is received at the remote terminal central office interface 140 and routed by the ATM multiplexer 160 to the queue 155. The remote terminal end point interface 145 recognizes the test cell based upon the identifier code contained in the test cell. Since the cell is a test cell, the remote terminal end point interface 145 loops back the cell.

Once the determination to loop-back the test cell is made, the remote terminal end point interface 145 changes the identifier code of the test cell. The looped back test cell is then routed by the ATM multiplexer 160 and queued in queue 150 for transmission from the remote terminal 65 to the central office terminal 60. The looped back test cell is transmitted and passes through the remote terminal central office interface 140 to the remote terminal interface 90 of the central office terminal 60, which determines whether to pass the looped back test through to the queue 100 or to send it to the central office processor queue 130 for processing by the central office processor 75 based upon the changed identifier code in looped back test cell. In the scenario depicted in FIG. 2 the looped back test cell is transmitted to the central office processor queue 130, however it could routed through the ATM switch 110 to the queue 100 associated with network interface 80. The network interface 80 would then read the looped back test cell, and based upon the identifier code, loop the looped back test cell to the ATM switch 110 which would route it to the central office terminal processor queue 130.

The test path 170 is determined by the identifier codes of the test cell. When the central office processor 75 generates a test cell it can have a code that allows it to pass through every interface except for one. This allows the test path 170 to cover a portion of any and all virtual channels that include the central office terminal 60. Further, each interface 80, 85, 90, 95, 140 and 145 can be programmed to pass through or loop back any number of different identifier codes thereby allowing great flexibility as to what portion of the virtual channel the test path 170 covers. Further, each interface could be programmed so that it changes identifier codes with specific relationships to received identifier codes so that virtual channels could be tested with one or more test cells. In addition, it is also possible that an interface, e.g. interface 140, not be programmed to check for identifier codes thereby reducing the processing needed at the interface.

The central office processor 75 can determine the status of the virtual channel in several ways. First, if a test cell is not returned within a selected time limit, a problem is determined to exist for the virtual channel. In one embodiment, test cells are launched one at a time and expected to return before the next test cell is launched. The payload is checked for integrity using, for example, a check sum technique. In one embodiment, there are fields in the payload to ensure that the cell received is the expected cell. In addition, the time between transmission of the test cell and receipt of the looped back test cell allows the central office terminal processor 75 to determine congestion related parameters of the virtual channel. This testing method allows for easy detection of cross-talk problems in the ATM switch 110, ATM multiplexer 160 or any of the queues, since misrouted test cells are routed to an error queue 185 by the ATM switch 110. Error queue 185 is used to collect cells with header errors. The contents of the error queue 185 are not usually monitored but the status (number of cells) is usually monitored.

Data and management cells transmitted to and from the network and end units 55 are assigned identifier codes that are passed through all of the interfaces and not looped back. In this way, there is no interference to the data and management cell flow along the virtual channels.

Figure 3:
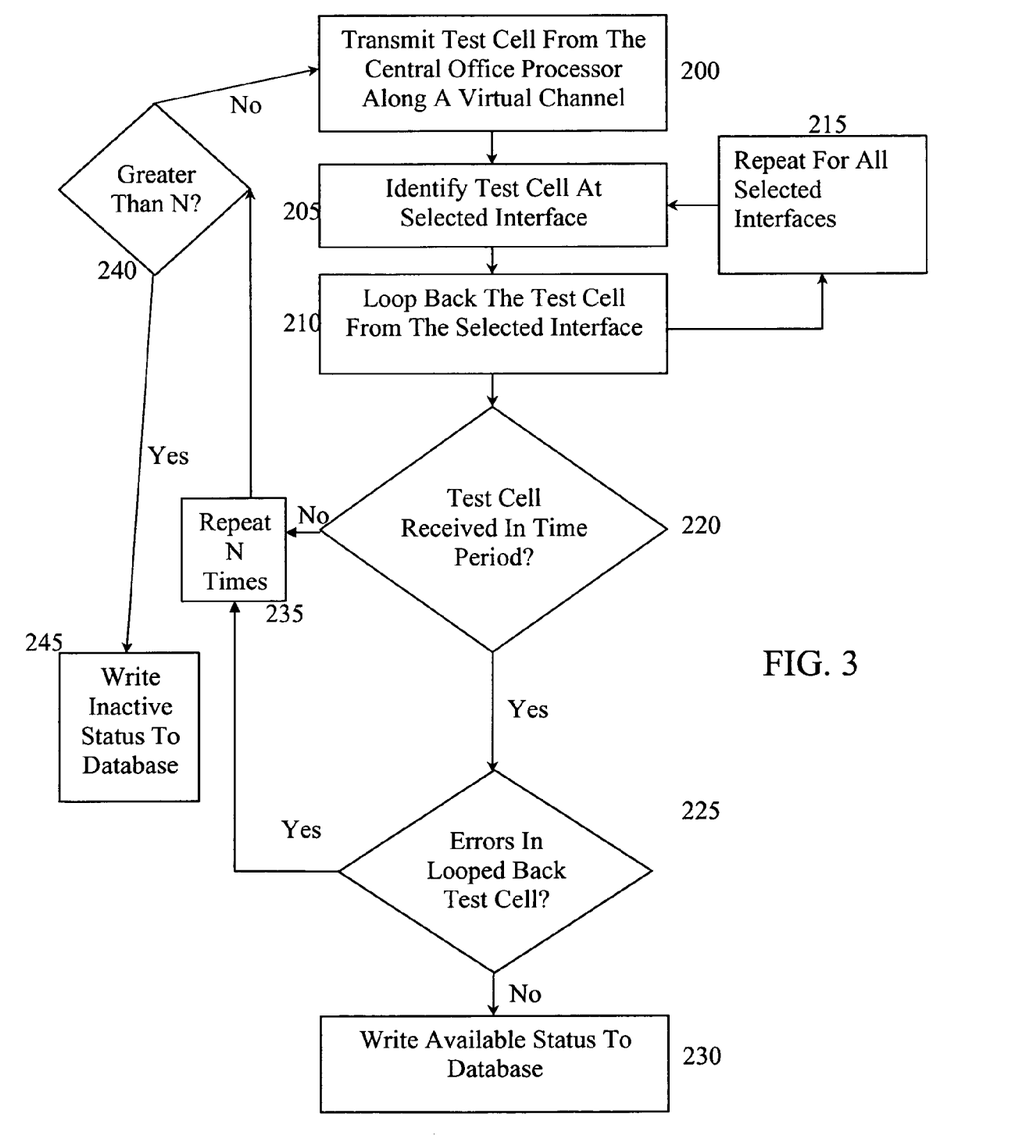
FIG. 3 is a flow chart showing a method of virtual channel loop-back testing according to one embodiment of the present invention.

Referring to FIG. 3, a test cell is injected from the central office processor 75 along a selected virtual channel, block 200. The test cell is interleaved with management and data cells that are received from the network for the virtual channel. The test cell then flows through the virtual channel and is identified as a test cell, directed to a specific port, by an interface for the specific port, block 205. This is done by an identifier code contained in the test cell, and preferably located in the Generic Flow Control (GFC) field of the test cell. Once the test cell is identified by the interface, the interface then changes the identifier code as preprogrammed and the test cell is "looped back" or passed through a selected portion of the virtual channel to allow a determination as to whether the ATM equipment is functioning properly at the ATM layer, block 210. The process is repeated for each interface that is required to loop-back the test cell based upon changes to the identifier code, block 215. The central office processor then determines if the looped back test cell is received within a selected time period, block 220. If the looped back test cell is received, then the central office processor analyzes the payload, block 225. If an error is contained in the payload, the status unavailable is written to the central office terminal database 70 for that virtual channel and error alert can be transmitted or provided on a view screen associated with the central office terminal 60, block 245. If no error is contained in the payload, then an available status for that virtual channel is written in the central office terminal database 70, block 230.

If the looped back test cell is not received within a selected period of time, then additional test cells are sent, block 235. If after a selected number of times the additional test cells are not returned, block 240, an unavailable status is written to the central office terminal database 70 for the virtual channel and unavailable alert can be transmitted or provided on a view screen associated with the central office terminal 60, block 245. For a connection between the central office terminal 60 and the remote terminal 65, it should be noted that if a physical alarm is active on any of the components through which the virtual channel passes, no error messages need be provided other than to be written in the central office terminal database 70, since it is likely that the physical component problem is in fact causing the fault for the virtual channel.

In order to test each of the virtual channels on a regular basis, in one embodiment, a test cell is sent for each of the virtual channels that pass through the central office terminal 60 at selected intervals, e.g., every 60 seconds.

Figure 4A:
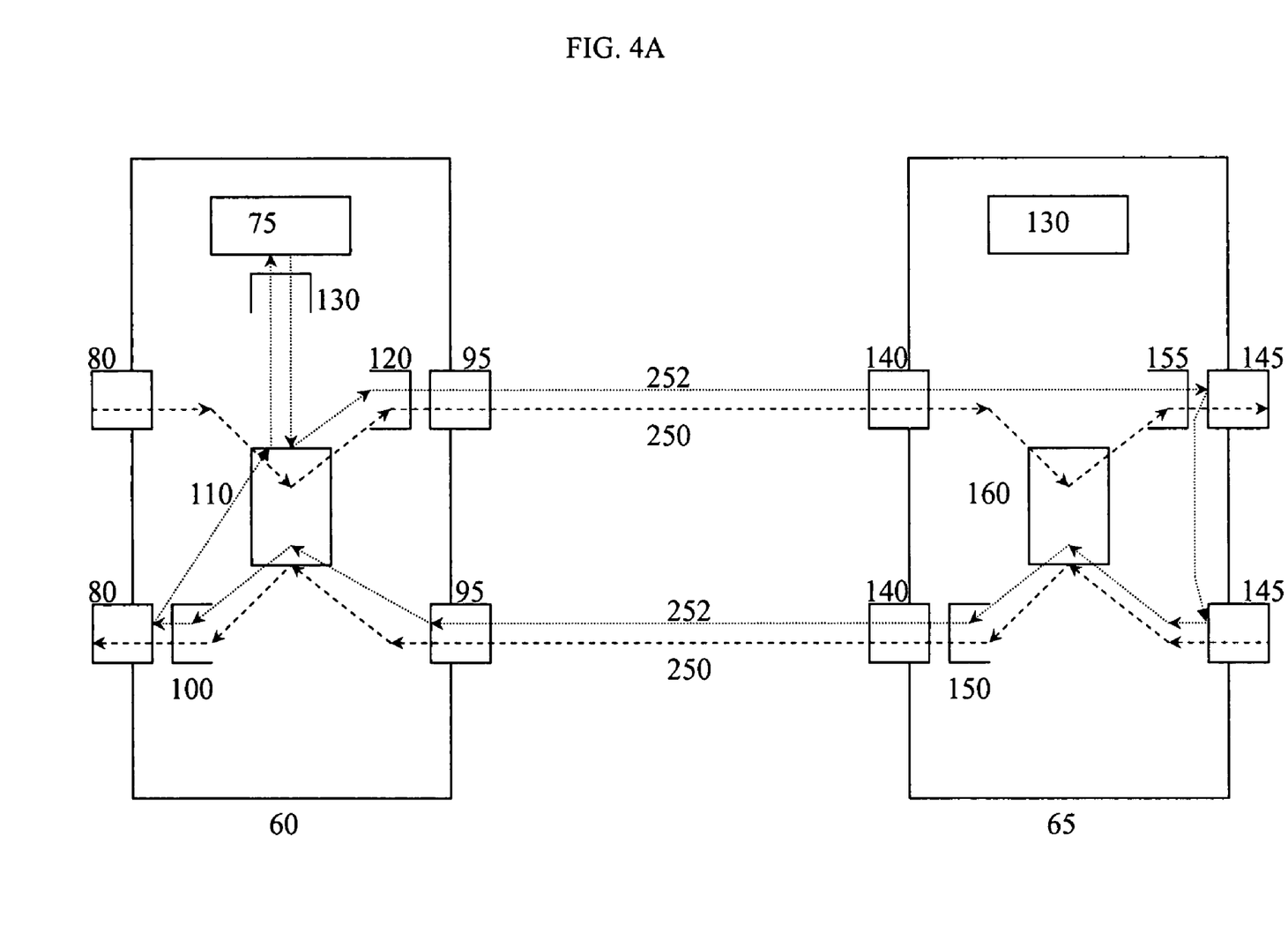
FIG. 4A is a first loop-back test path according to one embodiment of the present invention.
Figure 4B:
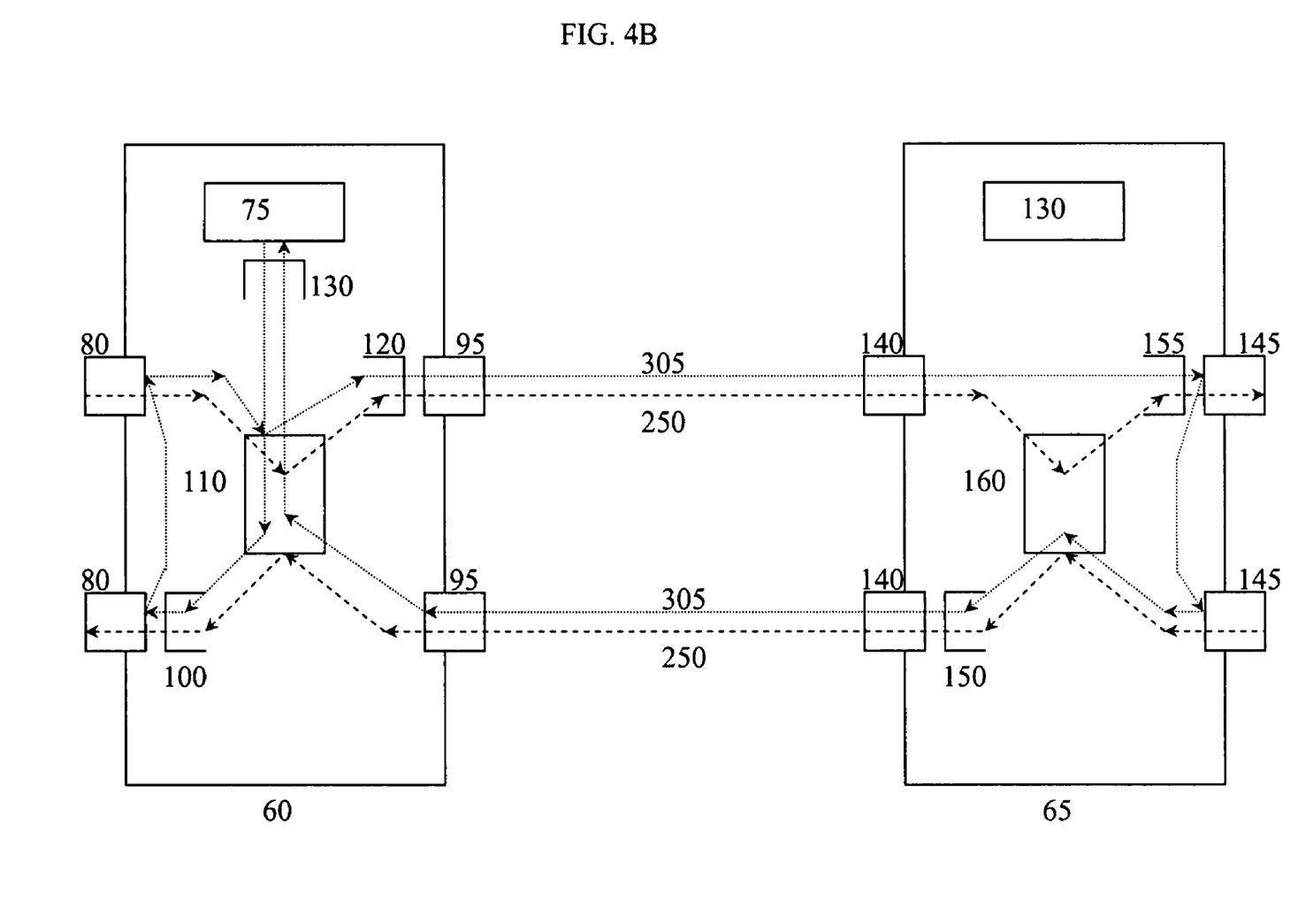
FIG. 4B is a second loop-back test path according to one embodiment of the present invention.

Referring to FIGS. 4A and 4B, in order to test a fully provisioned virtual channel in one embodiment, two test paths are utilized. The test paths are selected so that functions that support the virtual channel 250 between the network interface 80 and the DSL interface 145 are tested. In one embodiment, the selected functions are the routing, translation and queuing functionality for the virtual channel 250. In FIG. 4A, the first test path 252 includes a test cell written by the central office processor 75 and routed by the ATM switch 110 to the queue 120 from which it is transmitted by the remote terminal interface 95 to the remote terminal central office interface 140 of the remote terminal 65. The remote terminal central office interface 140 passes the test cell to the ATM multiplexer 160 that routes and translates the test cell into the queue 155 of the remote terminal 65. The DSL interface 145 then reads the test cell from the queue 155 and changes the identifier code in the test cell and writes it to the ATM multiplexer 160. The test cell is then routed by the ATM multiplexer 160 into the queue 150 of the remote terminal 65. The remote terminal central office interface 140 then transmits the looped back test cell to the central office terminal 60.

At the central office terminal 60, the remote terminal interface 95 passes the looped back test cell through the ATM switch 110 and is stored in the queue 100 of the central office terminal 60. The network interface 80 of the remote terminal 60 then reads the looped back test cell, changes the identifier code and sends the looped back test cell to the ATM switch 110 which routes it to central office terminal processor queue 130, where it is read by the central office processor 75. If the looped back test cell is not received within a selected time period or an error is detected in the looped back test cell, then an error can be written into the central office terminal database 70 and an appropriate error message or status can be visually displayed or otherwise provided.

The test path described in FIG. 4A tests all of the queues that the virtual channel utilizes. In addition, the test path includes most of the translation stages that the virtual channel utilizes. However, since the test cell enters the virtual channel from the central office terminal processor 75 and not the network interface 80 of the central office terminal 60, it is not routed at the input stage from the network interface. Because of this, the translation stage from port 80 through the switch fabric 110 to the remote terminal queue 120 is not tested. In other words, a data cell that is received from the network is first received at the network interface 80 and then routed at the associated port of the ATM switch 110 before being stored in the queue 120. To remedy this problem, the failure to pass through the port of the ATM switch 110 associated with the network interface 80, a second test cell as depicted in FIG. 4B is preferably sent a selected time after the first test cell as depicted in FIG. 4A.

Referring to FIG. 4B, a second test cell for transmission along a second test path 305 is generated by the central office terminal processor 75 and is routed by the ATM switch 110 to the queue 100 of the central office terminal 60 for transmission to the network. The network interface 80 then reads the second test cell, changes the identifier code of the second test cell and loops it back to the ATM switch 110. ATM switch 110 routes the cell to the queue 120. The looped back second test cell is then read by the remote terminal interface 95 and transmitted to the remote terminal 65. The central office interface 140 of the remote terminal 65 then lets the looped back second test cell flow through to ATM multiplexer 160, which routes the looped back second test cell to the queue 155. The DSL interface 145 then reads the looped back second test cell, changes the identifier code and passes the looped back second test cell to the ATM multiplexer 160 of the remote terminal 65, which in turn routes the looped back second test cell to the queue 150 of the remote terminal 65. The central office interface 140 of the remote terminal 65 then transmits the looped back second test cell to the remote terminal interface 95 of central office terminal 60, which then changes the identifier code of the looped back second test cell. The looped back second test cell is then passed to the ATM switch 110, which routes the looped back second test cell to the central office terminal processor queue 130. In this way, the test path in FIG. 4A and the test path in FIG. 4B pass test cells through each of the functional queuing, routing, and translation stages of the virtual channel.

In one embodiment, test paths in FIGS. 4A and 4B are utilized sequentially during run time, e.g., when the virtual channel is determined to be active. Further, the two test cells need to be spaced apart in time so that the first test cell is to be received, based upon normal congestion parameters, before the second test cell is to be received. In addition, in one embodiment, the virtual channel is tested often enough, at least once every minute, to ensure a high degree of reliability. In one embodiment, the entire path of the virtual channel is tested with a single cell rather than the two paths shown in FIGS. 4A and 4B.

Figure 5A:
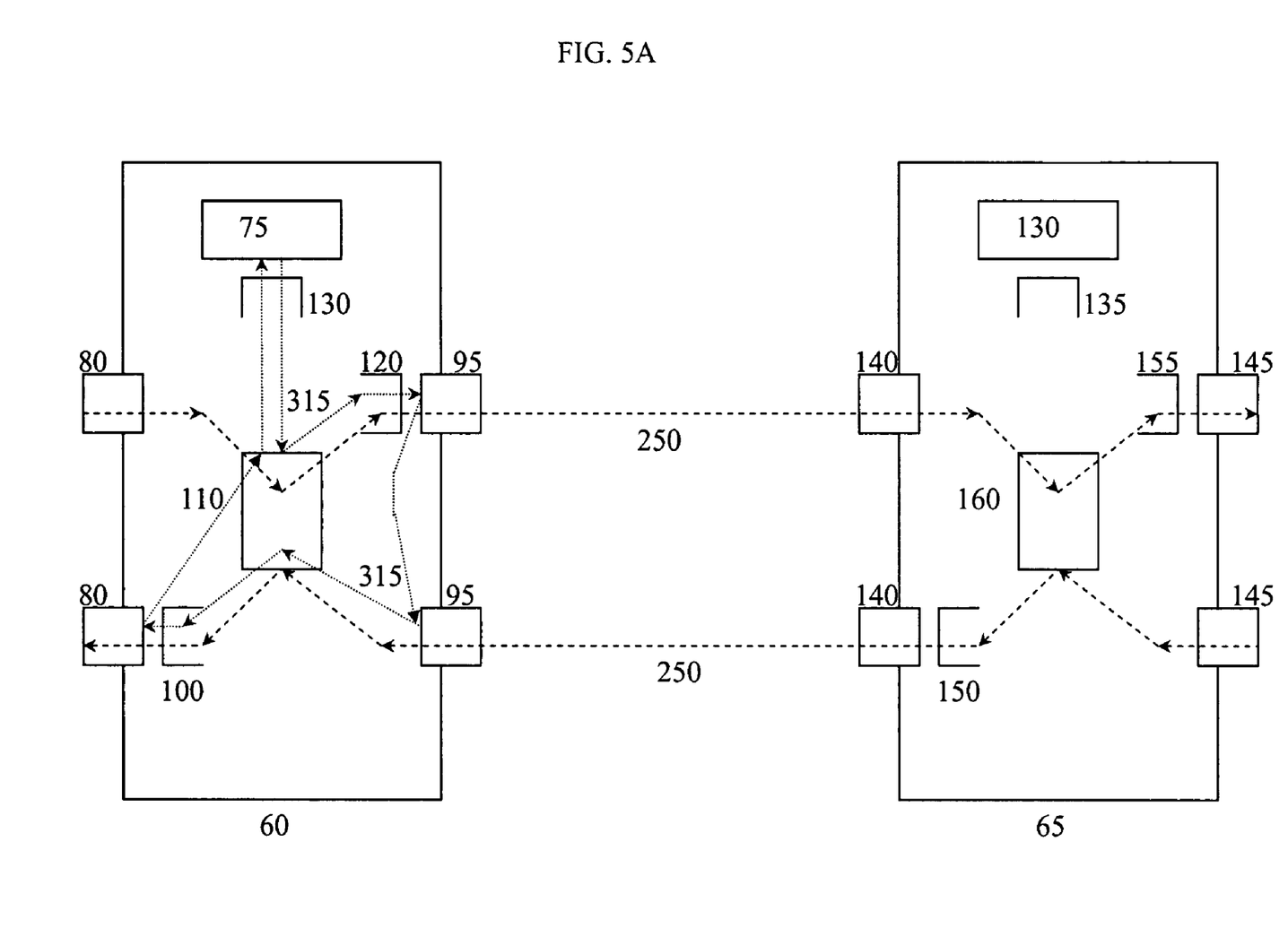
FIG. 5A is a third loop-back test path according to one embodiment of the present invention.

In FIG. 5A, the third test path 315 includes a test cell written by the central office processor 75 that is routed by the ATM switch 110 to the queue 120. The queue 120 then changes the identifier code of the test cell and sends it to the ATM switch 110 which routes the looped back test cell to queue 100. The network interface 80 then reads the looped back test cell, changes the identifier code and sends it to ATM switch 110. The ATM switch 110 then routes the looped back test cell to the central office terminal processor queue 130 where it is processed by the central office terminal processor 75. As described with respect to the first test path in FIG. 4A, the third test path 315 does not include the routing stage of cells that are received by the network interface 80. Therefore, a fourth test path 320 shown in FIG. 5B is provided for use in conjunction with the third test path 315.

Figure 5B:
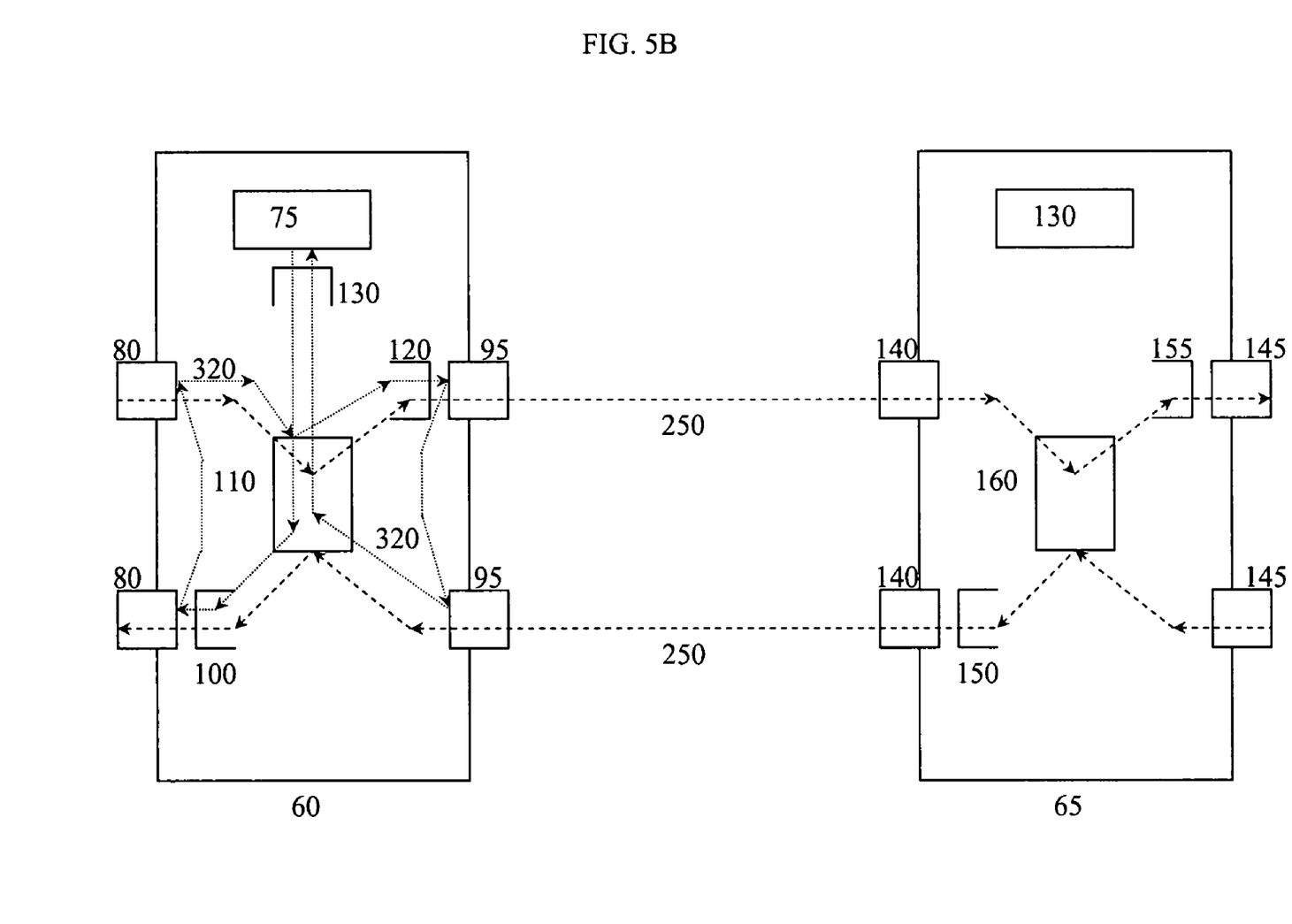
FIG. 5B is a fourth loop-back test path according to one embodiment of the present invention.

Referring to FIG. 5B, a fourth test path 320 uses a second test cell that is generated by the central office terminal processor 75 and is routed by the ATM switch 110 to the queue 100 of the central office terminal 60 for transmission to the network. The network interface 80 then reads the second test cell, changes the identifier code of the second test cell and loops it back through the ATM switch 110 to the output queue 120. The looped back second test cell is then read by the remote terminal interface 95 and looped back to the ATM switch 110, where it is routed to the central office terminal processor queue 130 to be processed by the central office terminal processor 75. The two test cells need to be spaced apart in time so that the first test cell is to be received, based upon normal congestion parameters, before the second test cell is to be received.

The test paths depicted in FIGS. 5A and 5B only test the queuing, routing and translation of the ATM switch 110 and central office terminal 60. The test paths in FIGS. 5A and 5B can be used in conjunction with the test paths in FIGS. 4A and 4B, where a test cell is not received back at the central office terminal processor. The use of the third test path 315 and the fourth test path 320 would provide a way to isolate where cross-talk or other problems are occurring, by being able to isolate the problem to either the central office terminal 60 or the remote terminal 65.

Test paths 315 and 320 of FIGS. 5A and 5B can be used when no virtual channel is active, either because it is not provisioned or when a remote terminal is not connected to the interface. However, in one embodiment, a status is written to the central office terminal database 70 that indicates that a remote terminal is not connected to the interface along with any errors or faults for the virtual channel, if in fact the remote terminal 65 is not connected.

In order to allow for operation of the first test path 252, second test path 305, third test path 315 and fourth test path 320, the central office terminal 60 is configured to allow a cross connect between all of the virtual channels in the central office terminal 60 and the central office terminal processor 75. In one embodiment, the test paths are configured so that a cross connect is set up between the central office processor 75 and network interface 80 and DSL interface 145 of each remote terminal 65.

It should be noted that in order for a virtual circuit to be written as unavailable, in one embodiment, at least two test cells, e.g., both first and second test cells consecutively, or either the first or second test cell within some predefined time period, be lost or have errors in them. This would prevent the situation of false unavailable status when the queues for any of the virtual channels are full due to congestions for short periods of time.

Figure 6:
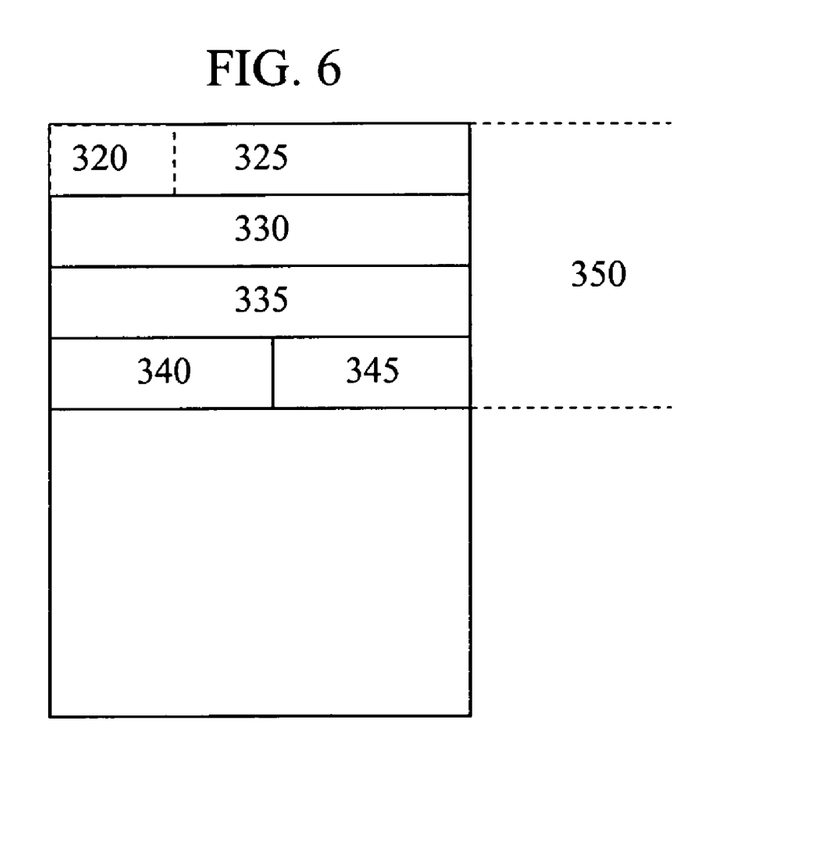
FIG. 6 is an ATM cell according to one embodiment of the present invention

Referring to FIG. 6, an identifier code 320 is located in the GFC field 325 of a test cell. The virtual path identifier 330, virtual channel identifier 335, payload type 340, and congestion loss priority 345 of the header 350 need not be utilized in order to test the virtual channel. Where a data or management cell is transmitted to or from the central office terminal 60 or remote terminal 65 they will have an identifier code 320 of 0h as specified in the International Telephone Union specification I.361, in this case it means that all cells received from the network and the DSL end points are assigned an identifier code of 0h. Other identifier codes 320 are checked at the network and DSL interfaces of the central office terminal 60 and remote terminal 65. In addition, the ATM switch 110 will route certain identifier codes 320 to the central office queue processor queue 130 and the error queue 185. Description of codes for one embodiment and how they are processed when received at the interfaces and ATM switch of the central office terminal 60 and remote terminal 65 is depicted in Table 1 below.

TABLE 1

| GFC Field Code | Network Interface 80 | ATM Switch 110 | Remote Terminal Interface 95 | Remote Terminal Central Office Interface 140 | DSL Interface 145 |
|---|---|---|---|---|---|
| 0h | Pass Through | No effect, cell routed according VPI and VCI | Pass Through | Pass Through | Pass Through |
| 1h | Change GFC field to Fh and send to ATM switch | No effect, cell routed according VPI and VCI | Change GFC field to Fh and send to ATM switch | Pass Through | Change GFC field to Fh and send to ATM multiplexer |
| 2h | Change GFC field to Fh and send to ATM switch | No effect, cell routed according VPI and VCI | Change GFC field to Fh and send to ATM switch | Pass Through | Change GFC field to Fh and send to ATM multiplexer |
| 3h | Change GFC field to Fh and send to ATM switch | No effect, cell routed according VPI and VCI | Change GFC field to Fh and send to ATM switch | Pass Through | Change GFC field to Fh and send to ATM multiplexer |
| 4h | Change GFC field to Fh and send to ATM switch | No effect, cell routed according VPI and VCI | Change GFC field to Fh and send to ATM switch | Pass Through | Change GFC field to Fh and send to ATM multiplexer |
| 5h | Change GFC field to Fh and send to ATM switch | No effect, cell routed according VPI and VCI | Change GFC field to Fh and send to ATM switch | Pass Through | Change GFC field to Fh and send to ATM multiplexer |
| 6h | Change GFC field to Fh and send to ATM switch | No effect, cell routed according VPI and VCI | Change GFC field to Fh and send to ATM switch | Pass Through | Change GFC field to Fh and send to ATM multiplexer |
| 7h | Change GFC field to Fh and send to ATM switch | No effect, cell routed according VPI and VCI | Change GFC field to Fh and send to ATM switch | Pass Through | Change GFC field to Fh and send to ATM multiplexer |
| 8h | Change GFC field to Fh and send to ATM switch | Route to central office terminal processor queue | Change GFC field to Fh and send to ATM switch | Pass Through | Change GFC field to Fh and send to ATM multiplexer |
| 9h | Change GFC field to Fh and send to ATM switch | No effect, cell routed according VPI and VCI | Pass Through | Pass Through | Change GFC field to 8h and send to ATM multiplexer |
| Ah | Change GFC field to 8h and send to ATM Switch | No effect, cell routed according VPI and VCI | Change GFC field to 8h and send to ATM switch | Pass Through | Change GFC field to Fh and send to ATM multiplexer |
| Bh | Change GFC field to 9h and send to ATM Switch | No effect, cell routed according VPI and VCI | Pass Through | Pass Through | Change GFC field to Ah and send to ATM multiplexer |
| Ch | Change GFC field to 8h and send to ATM Switch | No effect, cell routed according VPI and VCI | Change GFC field to 8h and send to ATM switch | Pass Through | Change GFC field to Fh and send to ATM multiplexer |
| Dh | Change GFC field to 9h and send to ATM Switch | No effect, cell routed according VPI and VCI | Pass Through | Pass Through | Change GFC field to Ch and send to ATM multiplexer |
| Eh | Change GFC field to Ch and send to ATM Switch | No effect, cell routed according VPI and VCI | Change GFC field to 9h and send to ATM switch | Pass Through | Change GFC field to Fh and send to ATM multiplexer |

TABLE 1-continued

| GFC Field Code | Network Interface 80 | ATM Switch 110 | Remote Terminal Interface 95 | Remote Terminal Central Office Interface 140 | DSL Interface 145 |
|---|---|---|---|---|---|
| Fh | Change GFC field to 9h and send to ATM Switch | Route cell to error queue of Central Office Terminal | Pass Through | Pass Through | Change GFC field to Fh and send to ATM multiplexer |

While the embodiments, applications and advantages of the present inventions have been depicted and described, there are many more embodiments, applications and advantages possible without deviating from the scope of the inventive concepts described and depicted herein. The invention should only be restricted in accordance with the scope of the claims appended hereto and is not restricted by the embodiments, specification or drawings.

What is claimed is:

1. A method for determining the status of virtual channels provisioned from a central office terminal, the method comprising:

generating periodic test cells that each comprise an identifier code, the test cells being transmitted from the central office terminal along test paths that comprise portions of the virtual channels provisioned at the central office terminal and including remote terminals the test cells being interleaved with data and management cells transmitted along the test paths;

determining if the test cells being transmitted from the central office terminal are received as looped back test cells, the determination being made based upon a changed identifier code written in the looped back test cells; and if the looped back test cells are received at the central office terminal then determining a status of the virtual channels by reading a payload of the looped back test cell.

2. The method of claim 1, wherein the central office terminal is communicatively coupled to the remote terminal.

3. A method for determining the status of virtual channels provisioned from a central office terminal, the method comprising:

generating periodic test cells that each comprise an identifier code, the test cells being transmitted from the central office terminal along test paths that comprise portions of the virtual channels provisioned at the central office terminal and including remote terminals, the test cells being interleaved with data and management cells transmitted along the test paths;

determining if the test cells being transmitted from the central office terminal are received as looped back test cells; and if the looped back test cells are received at the central office terminal then determining a status of the virtual channels by reading a payload of the looped back test cell.

4. The method of claim 2, wherein the central office terminal is communicatively coupled to the remote terminal.

5. A communication system comprising:

a central office terminal; and at least one remote terminal communicatively coupled to the central office terminal;

wherein the central office terminal generates periodic test cells that each comprise an identifier code, the test cells being transmitted from the central office terminal along test paths that comprise portions of the virtual channels provisioned at the central office terminal and including the remote terminal, the test cells being interleaved with data and management cells transmitted along the test paths;

wherein the central office terminal determines if the test cells being transmitted from the central office terminal are received as looped back test cells, the determination being made based upon a changed identifier code written in the looped back test cells; and wherein, if the looped back test cells are received at the central office terminal, the central office terminal determines a status of the virtual channels by reading a payload of the looped back test cell.

6. The communication system of claim 5, wherein the central office terminal is communicatively coupled to the remote terminal.

* * * * *